Patented Feb. 11, 1941

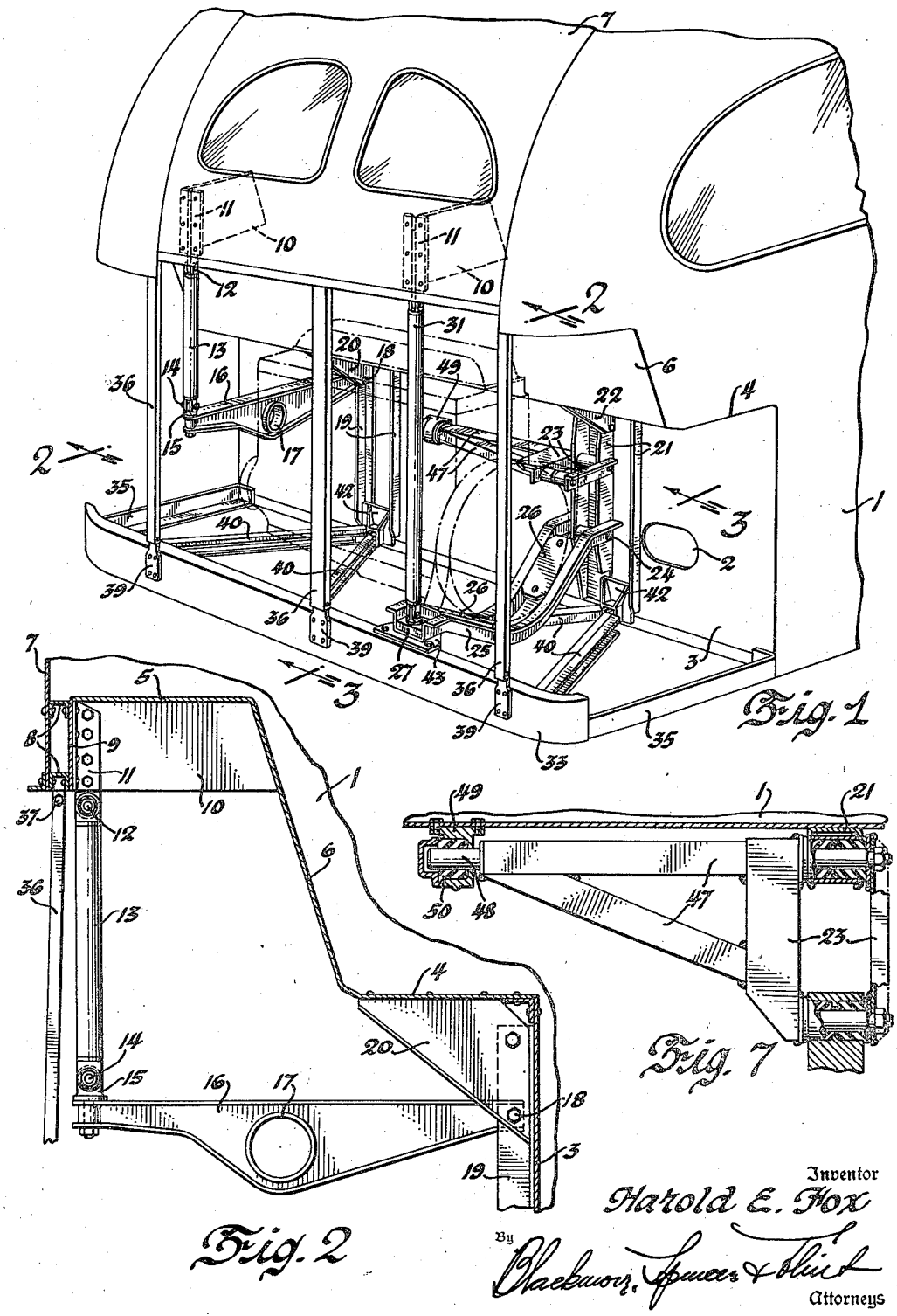

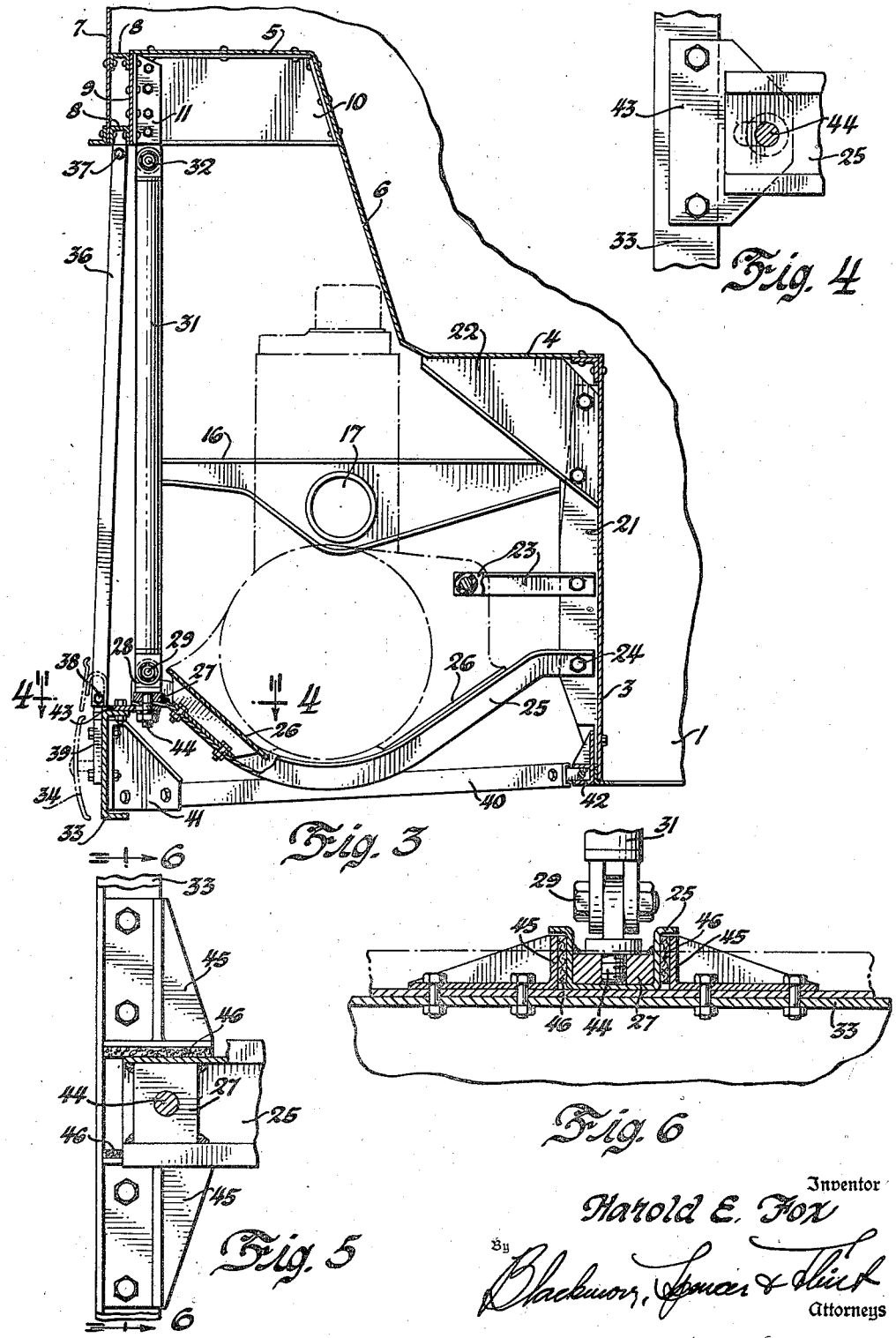

2,231,287

UNITED STATES PATENT OFFICE 2,231,287

ENGINE INSTALLATION

Harold E. Fox, Pontiac, Mich., assignor to Yellow Truck & Coach Manufacturing Company, Pontiac, Mich., a corporation of Maine Application February 23, 1940, Serial No. 320,269

12 Claims. (Cl. 180—54)

This invention relates to motor vehicles and more particularly to an improved coach end structure. Its primary object is to minimize the likelihood of serious damage to vital parts in the event of collision.

Conventional passenger buses incorporating a power plant at the back generally have a bumper structure extending across the rear wall to receive impacts and which is mounted on the ends of frame extensions or outriggers with the engine supported in whole or in part on the rear wall of the coach or on the bumper structure and its attaching frame extensions. Consequently, impacts received by the bumper and rear wall structure are transmitted directly to and impose twisting strains on the power plant. Weakening of parts or breakage caused by such strains as well as misalignment of the operating mechanism by reason of bumper distortion not only can put the vehicle out of commission and require costly replacement and repair but may also upset operating schedules and cause delay and inconvenience to a large number of passengers.

To avoid injury and failure of the operating mechanism as a result of impacts, it is here proposed to divorce the engine and the bumper and wall structures in the region of bumper impact and to provide an engine compartment recessed in the lower corner of the rear wall of the body and under the overhanging roof structure for the transverse disposition of the power plant therein, with the inner side supported by the usual bulkhead and the outer side suspended from overhead out of the region of impact whereby the operating mechanism is freed from damaging thrusts imposed on the bumper and remains undisturbed even though collision forces are sufficient to deflect and buckle the guard assembly. Even though the impact force is of such violence as to crush the rear wall and bulkhead of the coach body or otherwise throw the body structure out of line, the mounting of the engine through the use of yieldable connections in the mounting attachments reduces the probability of power plant damage.

A more detailed description of the improved end structure will be given with reference to the accompanying drawings wherein Figure 1 is a perspective view showing the rear end of a motor coach embodying the invention; Figures 2 and 3 are longitudinal sectional views taken on lines 2—2 and 3—3 of Figure 1; Figure 4 is an enlarged plan view of a locating connection as seen on line 4—4 of Figure 3; Figure 5 shows a modified locating retainer; Figure 6 is a section on line 6—6 of Figure 5, and Figure 7 is a plan view, partly in section, of a stabilizer.

Referring to the drawings the end of the coach body 1 includes a recess extending transversely across the lower corner for housing the power plant. The vehicle operating mechanism is omitted for the sake of clarity with only a phantom engine being illustrated by broken lines in Figures 1 and 3 and it will be understood that the ordinary power plant assembly comprises an engine and transmission coupled with the drive axle by a propeller shaft which projects forwardly through an opening 2 in the bulkhead 3. Cooperating with the vertical plate or wall of the bulkhead 3 in defining and separating the engine compartment from the passenger space, is a top wall having offset horizontal portions 4 and 5 joined by a vertically inclined portion 6. This Z-shaped compartment upper wall provides a transversely extending passenger seat inside the coach and connects the top of the bulkhead 3 with the lower edge of the rear wall 7 sweeping downwardly from and immediately below the coach roof. The connection with the rear wall 7 has the spaced reinforcement rails 8 riveted both to the rear wall panel and to a downwardly extending flange 9 on the overhead wall section 5.

For additional rigidity vertical stiffening plates 10, arranged at transversely spaced intervals, are riveted at their top edges with the wall 5 and at opposite ends to the wall 6 and the depending flange 9. Two of the stiffening plates 10 at proper locations each has in the corners between opposite faces thereof and the flange 9, a pair of angle straps 11 secured by bolts or rivets with the lower ends projected into the engine compartment to provide attachment ears. One set of ears receives a transverse pin or bolt 12 to join thereto a yoke on the upper end of a vertical suspension bar or tube 13. This suspension bar 13, which is relatively short, carries another yoke at its lower end to be fastened by a transverse pin 14 to an eye of a connector 15 on the outer end of the longitudinally extending engine hanger or cradle member 16 of I beam section. An enlarged opening 17 in the center of the bar 16 provides a trunnion bearing to which is fitted a part of the engine to be supported. At its inner end the bar 16 is fastened by a transverse bolt 18 to the upper portion of a rearwardly extending flange of one of a pair of angle straps 19 forming a part of the bulkhead 3. For convenience of design the fastening bolt 18 may be one which assists in anchoring a corner reinforcement plate 20 interposed between the bulkhead 3 and top wall section 4.

In transversely spaced relation with the set of stiffening rails 19 is a second set of bulkhead stiffeners 21, one of which is of channel section. Near the upper end of the channeled stiffener 21 is secured a corner reinforcement plate 22 and immediately therebelow are fastened a pair of angle straps 23 having connection with the bell housing of the engine. The connections at both ends of the tie straps 23 may include rubber insulating joints and the purpose of the tie is for torsional stability of the power plant on its flexible mountings and is especially useful when the engine rests on rubber pads. Also, fastened on the channel strap 21 by a transverse pin 24, is the inner end of a downwardly bowed engine bearer or hanger 25 consisting of an upwardly open channel member having a pair of spaced engine supporting pads 26 to be bolted to the engine flywheel housing. At its outer end a reinforcement block 27 is welded within the channel of the hanger 25 and a lug or ear 28 bolted thereto is fastened by a transverse pin 29 to a yoke on the lower end of a relatively long suspension bar 31 whose upper end carries a yoke fastened by a transverse pin 32 to the downwardly projecting ears on another of the beforementioned set of corner straps 11.

It is to be noted that the several fastening pins at opposite ends of the hangers and suspension bars all extend transversely on parallel axes and thus serve as pivot joints to afford a hinged action between the several parts should relative displacement occur for any reason between the bulkhead 3 and the lower edge of the rear wall 7 of the coach body. This accommodation of movement, together with the use of resilient engine mounting pads and the trunnion connection between the engine and hanger 16, reduces the likelihood of injury to the engine and its operating connection with the drive axle, due to racking strains in the body caused either by impact forces or road shocks incident to travel on rough and uneven road surface.

As a collision guard, the bumper structure is provided in the region of the lower rear corner of the coach and the engine compartment and consists essentially of a rugged channel member 33 over the rear face of which may be mounted the usual impact receiving bar 34, as seen in Figure 3. The channel member 33 extends transversely across the width of the coach and its opposite ends are curved forwardly and joined by straps 35 to the bulkhead 3. Swinging doors or removable panels, not shown, close the sides of the engine receiving recess or compartment.

Extending vertically between the bumper member 33 and the lower edge of the overhead coach structure are a series of transversely spaced tie rods 36 which suspend the bumper structure and are pivoted at their upper ends by pins 37 to the lower rail 8 and at their lower ends by bolts 38 to bumper brackets 39. Two pairs of diagonally related and forwardly converging attachment bars 40 rigidly locate the guard member 33 and serve to transmit impact forces regardless of their direction into the bulkhead and body framing with the vehicle operating mechanism entirely relieved therefrom. The several attachment bars 40 are joined by brackets 41, see Figure 3, to the guard member 33 and by brackets 42 to the bulkhead structure 3.

For transverse stability of the engine within the compartment, the guard member 33 may have bolted thereto a forwardly extending plate 43 provided with a longitudinally elongated opening for the passage therethrough of the fastening bolt 44 on the outer end of the hanger 25. The pin and slot afford a key which resists relative transverse movement between the parts while allowing relative longitudinal movements, such as might occur if the guard member is forced inwardly. The length of the slot is predetermined according to what may be considered the extent of relative movement likely to occur for any ordinary collision impact. However, as a safeguard against more violent collision forces either or both the locating plate and its fastenings are made light so as to be destructible and either the fastening bolts or the plate will shear or break before transmitting any damaging force through their connection with the engine hanger.

As an optional form of locating retainer against transverse movement of the engine, the top of the cross member 33 is shown in Figures 5 and 6 as having a pair of spaced angle brackets 45 located on opposite sides of the outer end of the hanger 25 to afford a longitudinal keyway in which the hanger is fitted. Friction linings 46 are interposed between the contact surfaces of the hanger 25 and locating plates 45 and as will be apparent, deflection of the bumper structure will not disturb or displace the operating mechanism.

For additional transverse stability of the power plant the drawings show a stabilizer assembly associated with the torque links 23 so as to relieve the rubber pads 26 from side load. As best seen in Figure 7 a pair of angularly related bars 47 are welded or otherwise joined to one of the links 23 and to each other at their point of convergence and terminate in a pin extension 48 which is secured in the bulkhead bracket 49. For insulation purposes a rubber liner or bearing bushing 50 may be interposed between the bracket and pin. The resulting transverse and diagonal bracing of the longitudinally extending links 23 makes for increased stability of the power plant and among other things assists in eliminating the effects of vibrations and the transmission of thrusts, such as otherwise might tend to loosen and disturb pipe lines and operating connections with the gearshift and other power plant control mechanism.

From the foregoing description it will be seen that the end structure is such as to afford an effective safeguard against serious injury, particularly to the essential drive mechanism. Even in severe collision the damage is likely to be confined to the wall panels or other less important structure, which can be remedied at relatively low cost at some convenient opportunity without tying up continued operation of the vehicle. When replacement is required the bumper bars and crash members are removed and replaced without disturbing the power plant or its operating connections with the drive axle.

As will be obvious the engine suspension and enclosing parts are so arranged as to afford ready accessibility to the power plant for inspection and adjustment. For coaches of different passenger carrying capacity all having the same basic rear end the same parts and arrangement may be employed even though the suspension bars 13 and 31 may need to be spaced apart different distances to accommodate the length of the particular engine to be supported.

I claim:

1. In a motor vehicle body, a power plant enclosing compartment recessed in one end of the body, a bulkhead between the power plant compartment and the interior load space of the body, an impact bumper located beyond said bulkhead, means supporting a power plant in said compartment and between the bulkhead and said bumper, and bumper bracing structure connecting the bumper with said bulkhead and being arranged to free said power plant supporting means from the transference of impact forces on the bumper into the bulkhead.

2. In a motor vehicle body, a bulkhead near one end, overhead structure projecting beyond the bulkhead and defining a motor compartment therebelow, a bumper having connection with both the bulkhead and overhead structure and means for supporting a motor in said compartment independently of the bumper and its connection with the bulkhead and overhead structure.

3. In a motor vehicle body, a bulkhead near one end, overhead structure projecting beyond the bulkhead and defining a motor compartment therebelow, a bumper, means including dependent members suspending the bumper from the overhead structure and longitudinal braces connecting the bumper with the bulkhead and other means suspending a motor from the overhead structure and connecting with the bulkhead independently of the first mentioned means.

4. In a motor vehicle body having an engine housed within a compartment at one end of the body, engine supporting connections on one side of the compartment, means suspended from the top of the compartment on the other side thereof for supporting connection with the engine, a protection bumper beyond said engine and means supporting the bumper from the body independently of the engine supporting connections, said bumper supporting means being so constructed and arranged that the engine and supporting connections are freed from the transference of impact on the bumper.

5. In a motor vehicle body having an engine housed within a compartment at one end of the body, a bumper arranged beyond the engine, bumper supporting brackets carried by the body, a pair of hangers in which the engine is cradled, means connecting an end of each hanger to the body at the inner side of the compartment and suspension members connected at their lower ends to the outer ends of said hangers and at their upper ends with the top of the compartment.

6. The structure of claim 5 wherein the several connections involve pivot joints on parallel transverse axes.

7. In a motor vehicle body having an engine compartment extending transversely across one end, an impact protection guard structure at the outer lower corner of the compartment, engine supporting structure within the compartment comprising a pair of transversely spaced engine hangers extending longitudinally of the compartment and being joined at their inner ends to the body, means suspending the outer ends of the hangers from the roof of the compartment and a locating innerlock comprising a destructible connection between the engine supporting structure and guard structure.

8. In a motor vehicle body having an engine compartment extending transversely across one end, an impact protection guard structure at the outer lower corner of the compartment, engine supporting structure within the compartment comprising a pair of transversely spaced engine hangers extending longitudinally of the compartment and being joined at their inner ends to the body, means suspending the outer ends of the hangers from the roof of the compartment and a locating innerlock between the engine supporting structure and the guard structure to resist transverse movement of the supporting structure relative to the guard structure without substantial interference to relative longitudinal movement.

9. The structure of claim 8 wherein the interlock comprises a pin carried by one of the structures to fit a longitudinal elongated slot in a destructible plate carried by the other structure.

10. In a motor vehicle body having an engine compartment extending transversely across one end, an impact protection guard structure at the outer lower corner of the compartment, engine supporting structure within the compartment comprising a pair of transversely spaced engine hangers extending longitudinally of the compartment and being joined at their inner ends to the body, means suspending the outer ends of the hangers from the roof of the compartment and a locating innerlock including a longitudinally extending keyway carried by one of the structures and a complementary key carried by the other structure.

11. In a motor vehicle body having an engine compartment extending transversely across one end, an impact protection guard structure at the outer lower corner of the compartment, engine supporting structure within the compartment comprising a pair of transversely spaced engine hangers extending longitudinally of the compartment and being joined at their inner ends to the body, means suspending the outer ends of the hangers from the roof of the compartment and a locating innerlock including a longitudinally extending keyway on one of the structures, a key on the other structure slidable in said keyway and friction lining between the surfaces of the keyway and key.

12. In a motor coach having an end bulkhead and overhanging roof structure providing a reentrant power plant compartment extending transversely of the coach in the lower corner thereof, a collision impact structure defining the outer margin of the compartment space, a power plant in said compartment and means for transferring power plant load into the coach structure independently of said impact structure whereby said means is freed from transference of blows on the impact structure.

HAROLD E. FOX.